United States Patent [19]

Bidwell

[11] Patent Number: 5,546,852
[45] Date of Patent: Aug. 20, 1996

[54] FOOD PREPARATION ASSEMBLY

[76] Inventor: Robert E. Bidwell, 27 Montrose Pl., Melville, N.J. 11747

[21] Appl. No.: 372,443

[22] Filed: Jan. 13, 1995

[51] Int. Cl.6 .................................................. B23Q 3/00
[52] U.S. Cl. ............................ 99/446; 99/444; 99/495; 269/15; 269/289 R; 210/259; 210/521
[58] Field of Search ........................... 99/425, 444, 445, 99/446, 495; 269/13, 15, 289 R, 302.1; 452/194; 210/259, 513, 521

[56] References Cited

U.S. PATENT DOCUMENTS

| | | | |
|---|---|---|---|
| 588,057 | 8/1897 | Foltz | 269/35 |
| 844,529 | 2/1907 | Meyers | 269/13 |
| 888,294 | 5/1908 | Affleck | 269/13 |
| 1,222,390 | 4/1917 | Gorham et al. | 99/425 |
| 2,751,951 | 6/1956 | Strathaus | 269/54.5 |
| 2,778,324 | 1/1957 | Mattson | 269/289 R |
| 3,598,164 | 8/1971 | August | 269/13 |
| 4,447,051 | 5/1984 | Price | 269/302.1 |
| 4,653,737 | 3/1987 | Haskins et al. | 269/13 |
| 4,907,789 | 3/1990 | Tice | 269/13 |
| 4,924,843 | 5/1990 | Waren | 269/289 R |
| 4,977,644 | 12/1990 | Evans et al. | 452/195 |
| 5,098,338 | 3/1992 | Jensen | 452/194 |
| 5,116,279 | 5/1992 | Perry | 452/195 |
| 5,121,909 | 6/1992 | Stickel, III | 269/289 R |
| 5,203,548 | 4/1993 | Sanders | 269/302.1 |
| 5,366,208 | 11/1994 | Benjamin | 269/289 R |

FOREIGN PATENT DOCUMENTS

| | | | |
|---|---|---|---|
| 2343461 | 11/1977 | France | 269/15 |
| 2460125 | 2/1981 | France | 269/302.1 |

Primary Examiner—David Scherbel
Assistant Examiner—Reginald L. Alexander
Attorney, Agent, or Firm—Dilworth & Barrese

[57] ABSTRACT

A food preparation assembly is disclosed which includes a carving board unit including a carving platform having a substantially planar carving surface with a collection channel defined therein extending about the periphery of the carving surface to collect drippings for separation into fat and juice, and a cutting board unit including an upper cutting surface and a lower undersurface. At least two parallel flanges depend from the undersurface of the cutting board unit which are dimensioned and configured to engage the collection channel in the carving platform to stabilize the cutting board unit during utilization.

22 Claims, 7 Drawing Sheets

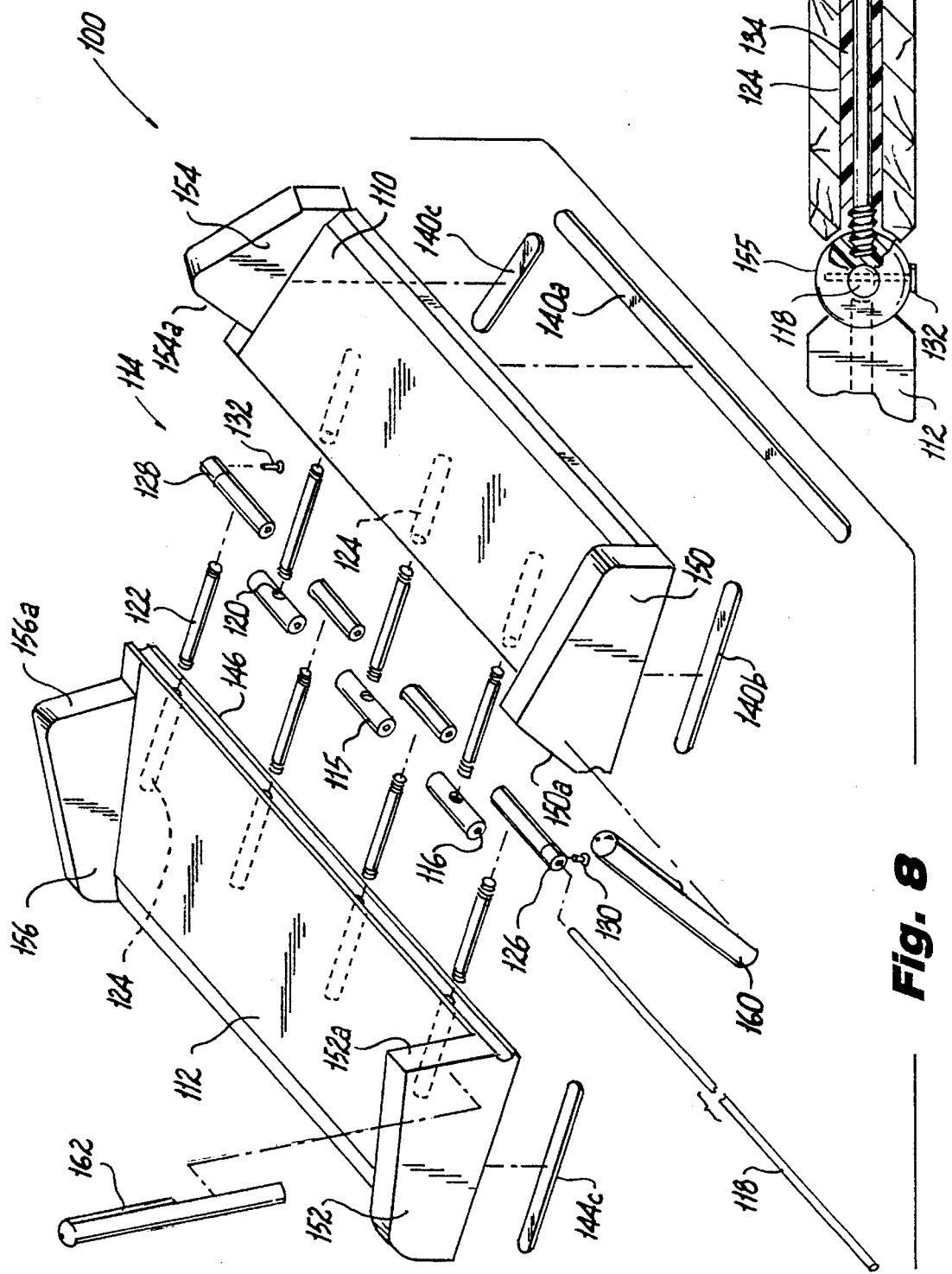

5,546,852

FOOD PREPARATION ASSEMBLY

BACKGROUND OF THE INVENTION

1. Field of the Invention

This invention relates to a food preparation assembly, and more particularly, to a carving board configured to collect drippings and a foldable cutting board configured to be mounted on the carving board.

2. Description of the Related Art

Carving boards for the preparation of meats are known in the art and have been constructed to collect and/or drain liquids flowing from the carved meat. For example, U.S. Pat. No. 3,598,164 to August describes a carving board having an inclined surface with an elongated slot formed adjacent the lower-most end of the inclined surface to permit the drainage of liquids from the carving surface into a receptacle. Such liquids are often used as gravy or dressing for the meat when it is served. However, these liquids will necessarily contain both the desirable natural juices flowing from the meat as well as the less desirable liquid fat.

In todays health conscious society, it has become well recognized that a low fat diet is important to healthier living. It would be beneficial therefore, to provide a carving board which is adapted to collect and separate desirable meat juices from less desirable fatty liquids, so that the juices can be subsequently utilized and the fatty liquids can be discarded.

Cutting boards for the preparation of fruits and vegetables are also known in the art, and often comprise a flat cutting surface upon which fruits and vegetables are sliced and subsequently directed into a bowl or similar receptacle with a knife or other object. Often, when transferring sliced vegetables prepared on a cutting board to a suitable receptacle, it becomes difficult to manipulate or orient the cutting board in an appropriate manner so as not to cause the vegetables to spill or fall from the board. A cutting board which provides one solution to this problem has been disclosed in U.S. Pat. No. 5,203,548 to Sanders and includes a planar cutting surface that is foldable into a chute-like configuration to prevent cut or sliced vegetables from spilling during transfer from the board to a receptacle.

Another problem that exists with traditional vegetable cutting boards is the inability to maintain the cutting board in a stable position during utilization. For instance, while slicing, conventional cutting boards can slip or slide upon a supporting surface, presenting a potential safety hazard to the user. It would be beneficial therefore, to provide a cutting board that is configured to be maintained in a fixed position upon a support surface during utilization.

SUMMARY OF THE INVENTION

The subject invention is directed a carving board assembly comprising a carving board platform having a substantially planar carving surface and having a sloped collection channel defined therein which extends about the periphery of the carving surface to collect drippings. Separator means are associated with the collection channel for separating the drippings in dependance upon relative density and for distributing the separated drippings to respective catchment basins associated with the platform for subsequent utilization or discardment.

The separator means includes a distribution network defined in the carving platform in communication with the collection channel, and a density selective dam disposed within the distribution network to control the relative flow of the constituents of the drippings, i.e., the natural meat juices and the fatty liquids. The distribution network is defined by a central collection reservoir, opposed first and second radial channels, an annular channel associated with each radial channel, and an exit port associated with each annular channel to permit the egress of separated drippings from the distribution network into the catchment basins.

The subject invention is also directed to a foldable cutting board assembly comprising first and second substantially planar board sections each defining a respective cutting surface. The cutting board sections are hingedly connected to one another along adjacent lateral edges, and each of the board sections have opposed front and rear edges including upstanding walls at each edge. The upstanding walls disposed at the front edges of the first and second board sections together define a passageway through which objects cut on the cutting surfaces are passed when transferred from the board into an appropriate receptacle. The board sections are configured to be disposed parallel to one another to cut objects thereupon, and at an angle to one another to funnel the cut objects through the passageway.

The subject invention is also directed to a food preparation assembly comprising a carving board unit including a carving platform having a substantially planar carving surface with a collection channel defined therein which extends about the periphery thereof for collecting drippings, and a cutting board unit including an upper cutting surface and a lower undersurface associated with the carving platform. At least two parallel flanges depend from the undersurface of the cutting board unit which are dimensioned and configured to engage the collection channel in the carving platform to stabilize the cutting board unit during utilization.

These and other features of the subject invention will become more readily apparent from the following detailed description of the invention taken in conjunction with the drawings.

BRIEF DESCRIPTION OF THE DRAWINGS

So that one skilled in the art to which the subject invention appertains will better understand how to make and use the food preparation assembly of the subject invention, preferred embodiments of the assembly will be described hereinbelow with reference to the drawings wherein:

FIG. 8 is an exploded perspective view of the cutting board assembly of the subject invention;

FIG. 9 is an enlarged localized cross-sectional view of a portion of the hinge assembly of the cutting board assembly of FIG. 8;

DETAILED DESCRIPTION OF THE PREFERRED EMBODIMENTS

Figure 1:
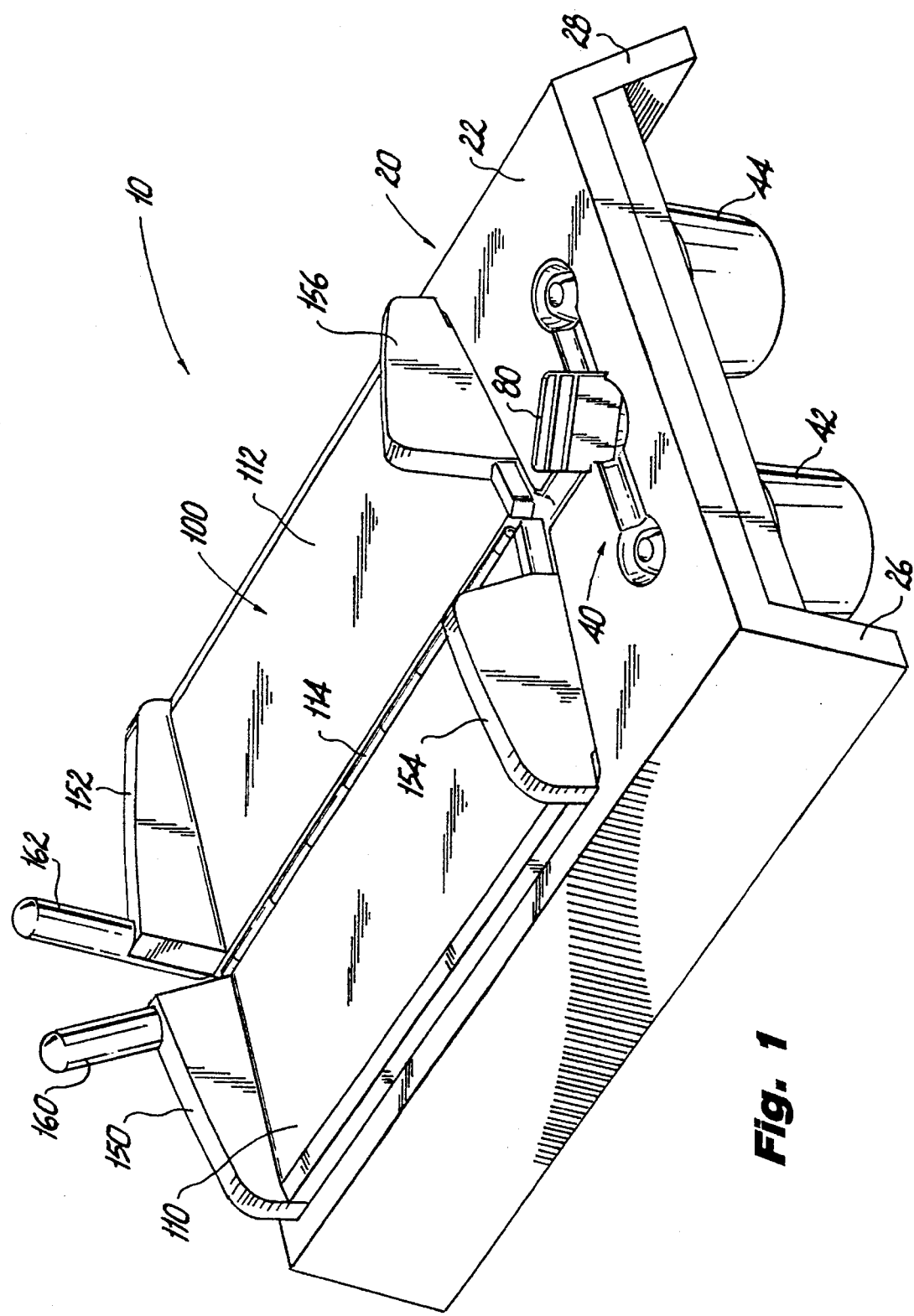
FIG. 1 is a perspective view of a food preparation assembly constructed in accordance with a preferred embodiment of the subject invention and including a cutting board assembly and a carving board assembly.

Referring now to the drawings, wherein like reference numerals identify similar structural elements of the subject invention, there is illustrated in FIG. 1 a food preparation assembly constructed in accordance with a preferred embodiment of the subject invention and designated generally by reference numeral 10. Food preparation assembly 10 includes a carving board assembly 20 for preparing meats (see FIG. 3), and a cutting board assembly 100 for preparing fruits and vegetables (see FIG. 7). Carving board assembly 20 is configured to collect and separate the constituents of meat drippings in dependence upon the relative densities thereof for subsequent utilization and/or discardment, and cutting board assembly 100 is configured to fold into a channel-like configuration to conveniently transfer sliced vegetables to an appropriate receptacle without risk of spillage. In addition, the carving board assembly is uniquely configured to support and maintain the cutting board assembly in a stabilized position during utilization.

Figure 2:
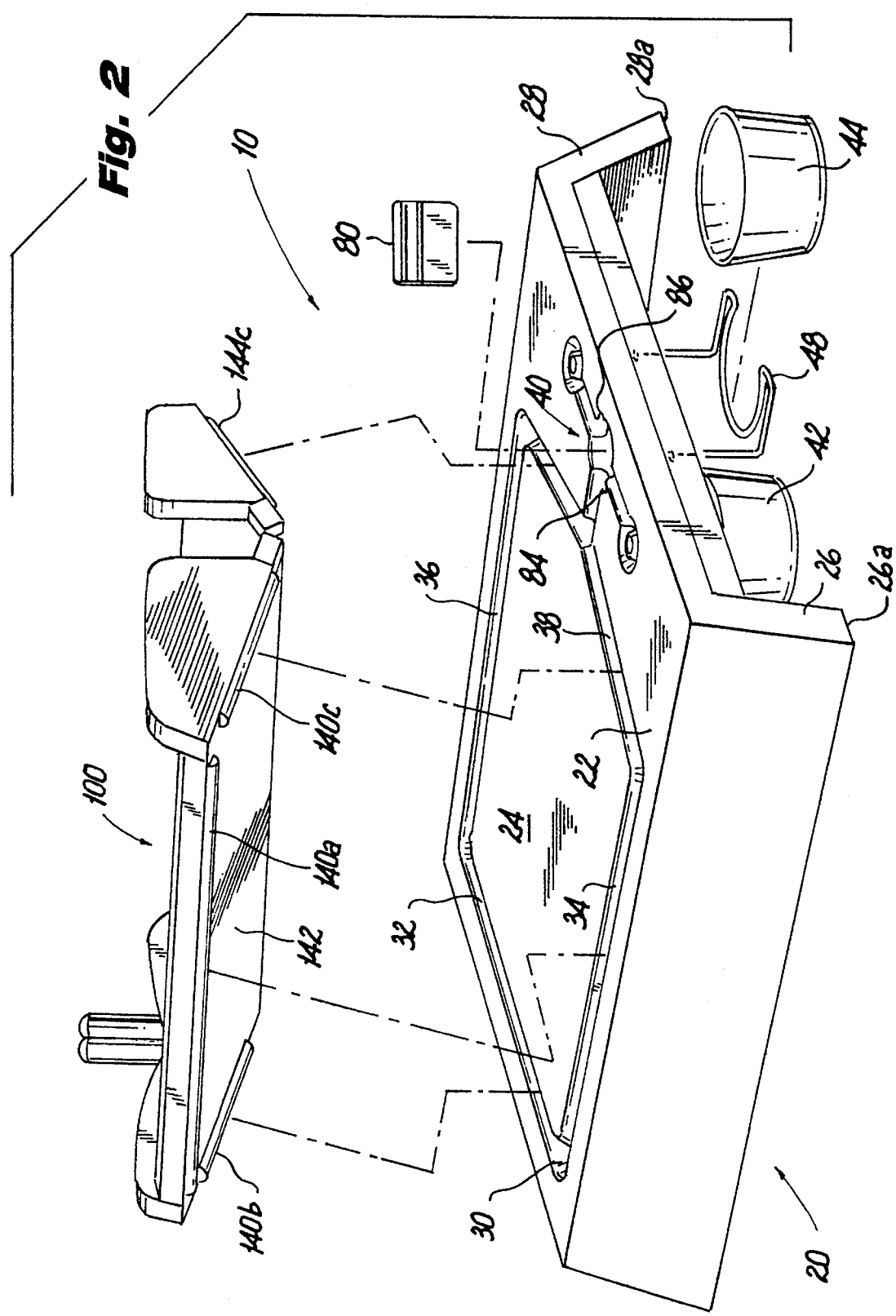
FIG. 2 is a perspective view of the food preparation assembly shown in FIG. 1 with the parts thereof separated from one another for ease of illustration.

Referring now to FIG. 2, carving board assembly 20 includes a carving platform 22 defining a generally planar carving surface 24 and having two opposed lateral support struts 26 and 28 which depend therefrom to elevate the carving surface. The respective lower surfaces 26a and 28a are texturized to prevent slippage by increasing frictional resistance on a supporting surface. A collection channel 30 is formed in carving platform 22 to collect liquid drippings emanating from carved meats. Collection channel 30 extends about the periphery of carving platform 24 and is defined by a rear channel section 32, opposed lateral channel sections 34 and 36, and a front channel section 38.

Figure 6:
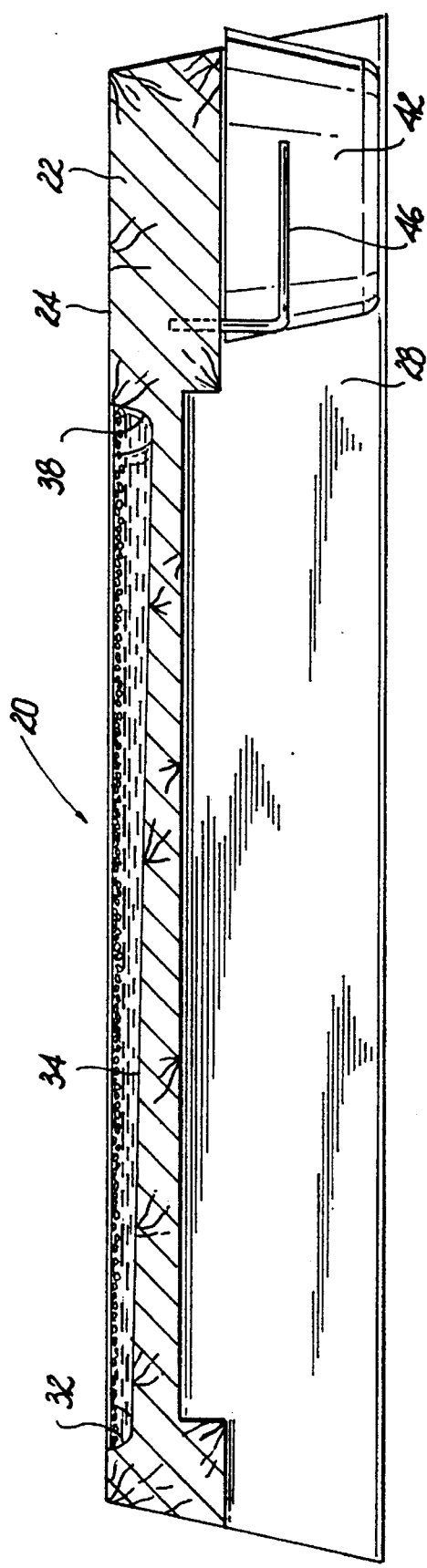
FIG. 6 is a cross-sectional view taken along line 6—6 of FIG. 5 showing the slope of the peripheral collection channel formed within the carving surface of the carving board assembly of FIG. 3.

As best seen in FIG. 6, the lateral channel sections, exemplified by lateral channel section 34, are sloped and increase in depth from rear channel section 32 to front channel section 38. Collection channel 30 communicates with a distribution network 40 wherein the drippings from carved meats are separated in dependence upon the density of the constituent parts thereof, i.e., natural meat juices and fatty liquids. The separated drippings are directed to respective catchment basins 42 and 44 which are supported beneath carving platform 22 by support brackets 46 and 48. Once collected, the desirable natural meat juices can be served as a gravy or dressing, and the fatty liquids can be discarded. Support brackets 46 and 48 are preferably formed of a spring steel and are configured to normally exert a radially inward biasing force on the catchment basins.

Figure 4:
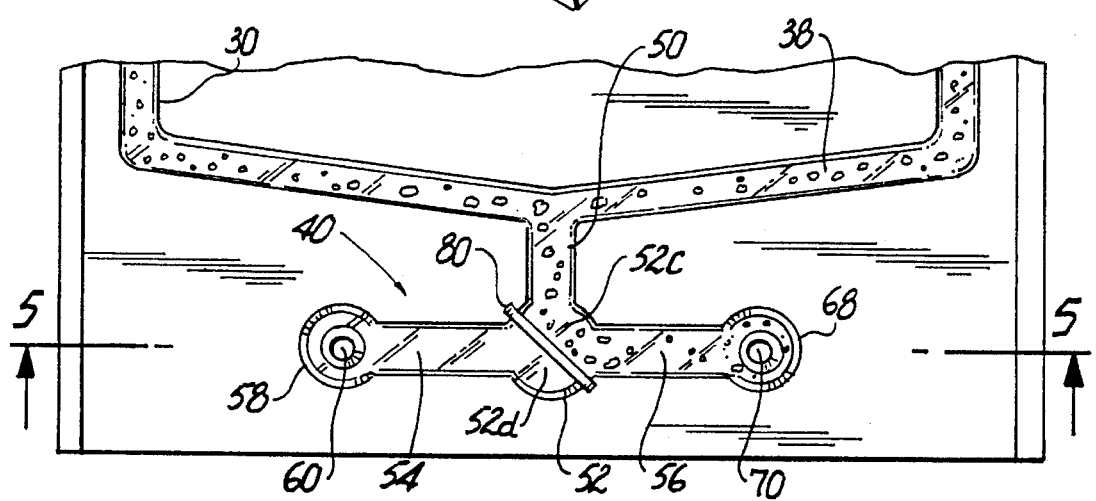
FIG. 4 is a top plan view of a section of the carving surface of the carving board assembly of FIG. 3 illustrating the distribution network defined in the carving board for facilitating the separation of the collected drippings.
Figure 4A:
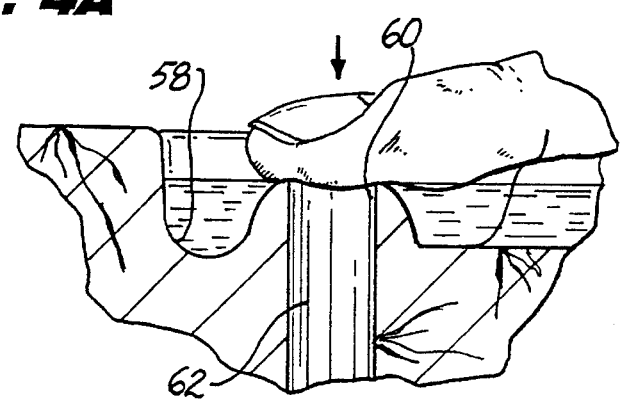
FIG. 4A is an enlarged localized view of a drainage area defined on the carving board wherein flow is blocked by a user's finger.
Figure 5:
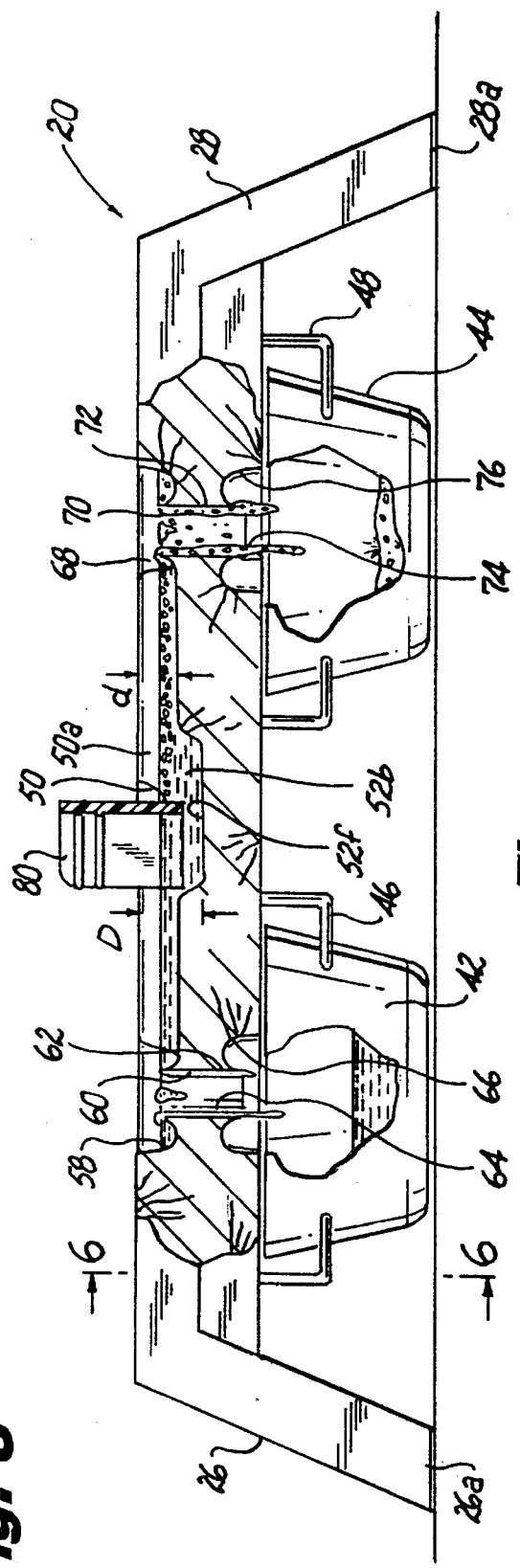
FIG. 5 is a cross-sectional view taken along line 5—5 of FIG. 4 illustrating the separation of the constituents of the drippings within the distribution network.

Referring to FIG. 4, distribution network 40 includes a guide channel 50 depending from the front channel section 38 of collection channel 30, a central collection reservoir 52, and opposed radial channels 54 and 56 which depend from collection reservoir 52. An annular channel 58 is formed at the terminal end of radial channel 54. An inlet port 60 is formed within annular channel 58 and defines a bore 62 through which drippings egress from distribution network 40. As best seen in FIG. 5, an outlet port 64 is defined at the lower end of bore 62 and is surrounded by an annular relief channel 66. Relief channel 66 enables the outlet port 64 to be temporarily plugged by a user's finger, as shown in FIG. 4A, to allow removal of catchment basin 42. An annular channel 68 is formed at the terminal end of radial channel 56 with an inlet port 70 formed therein to define a bore 72 through which separated drippings egress from distribution network 40. Bore 72 has an outlet port 74 which is surrounded by an annular relief channel 76 configured to be temporarily plugged by a user's finger (see FIG. 4A).

Referring to FIG. 5, the central reservoir 52 of distribution network 40 has a depth "D" that is greater than the depth "d" of guide channel 50, and radial channels 54 and 56. A dam plate 80 is removably supported within the central reservoir 52 of distribution network 40 to control the flow of the drippings and thereby facilitate the density dependent separation of the constituent parts of the meat drippings. As illustrated in FIG. 2, diametrically opposed engagement slots 84 and 86 are defined in the upper peripheral wall region 52a of reservoir 52 for receiving side portions of dam plate 80 to maintain the dam plate in the upright orientation shown in FIG. 1. As best seen in FIG. 5, the lower peripheral wall region 52b of reservoir 52 is inwardly tapered and thus dam plate 80 is maintained in an elevated orientation with respect to the floor 52f of reservoir 52.

Figure 3:
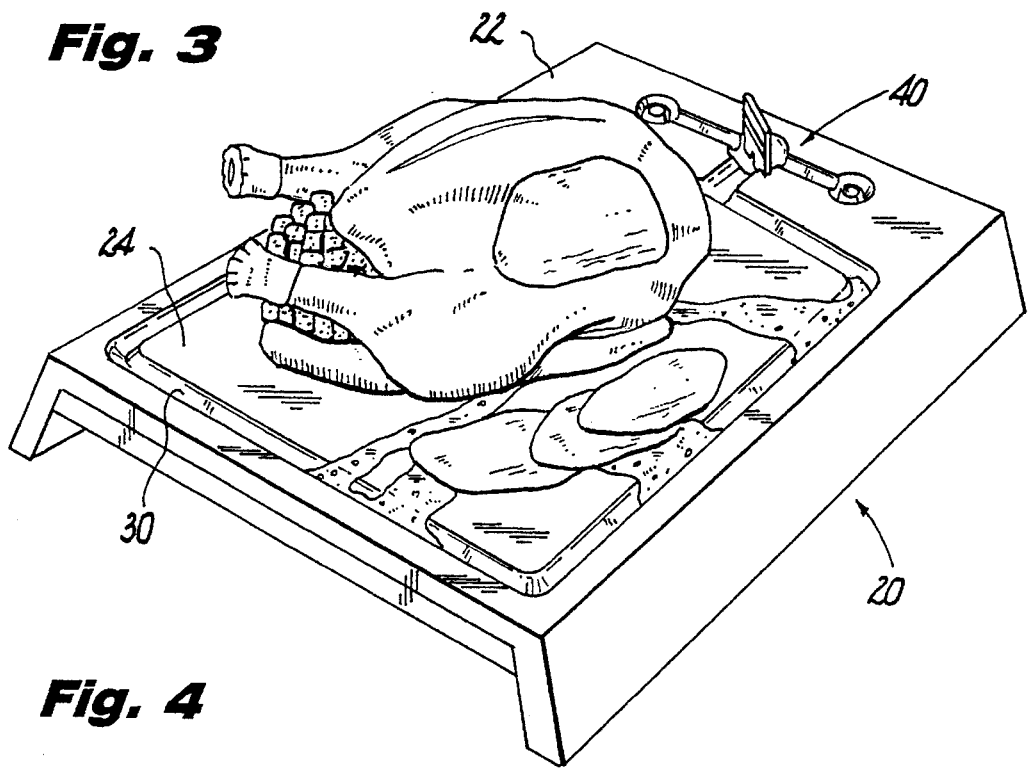
FIG. 3 is a perspective view of the carving board assembly of the subject invention during a carving operation wherein drippings are collected within a peripheral channel formed therein.

Referring to FIG. 3, in use, when meat is carved on carving surface 24, drippings emanating from the meat flow into collection channel 30. As noted above, the drippings generally consist of natural juices from the meat and liquid fat, and can also include morsels of gristle. The liquid fat has a lower density than the natural juices, and therefore, it rises above the denser natural juices as it accumulates within collection channel 30. The buoyant morsels also tend to float above the denser natural juices. As the drippings accumulate, the slope of lateral channel sections 34 and 36 direct the drippings through guide channel 50 and into collection reservoir 52, as illustrated in FIG. 4.

Referring to FIG. 5, upon entering collection reservoir 52, the drippings encounter dam plate 80. At such a time, dam plate 80 is positioned in a manner so as to divide reservoir 52 into two areas, namely, a reception area 52c for receiving the unseparated drippings and a deposit area 52d within which the separated natural juices accumulate. As the unseparated drippings flow into reception area 52c, the dense natural juices descend to the lower regions of the reservoir, while the lighter, more buoyant liquid fat, gathers in the upper regions of the reservoir. As the less dense constituents gather within the reception area 52c, their flow is impeded by dam plate 80, and they are forced to flow into radial channel 54. From radial channel 54, these less dense constituents accumulate within annular channel 58 and eventually egress through the inlet port 60 of bore 62, and are received within catchment basin 42. Once collected in basin 42, the undesirable fatty liquids can be easily discarded.

At the same time, the denser natural juices which descend to the lower regions of reservoir 52 flow beneath the lower portion of dam plate 80 and fill in the deposit area 52d of reservoir 52. From the deposit area, these denser constituents flow into radial channel 56, accumulate within annular channel 68, and egress through the inlet port 70 of bore 72 into catchment basin 44 for subsequent use as dressing or gravy. If, during a carving procedure, catchment basin 44 becomes filled to capacity, flow through either the inlet portion 70 or the outlet port 74 can be easily blocked by placing a finger over the particular port as illustrated in FIG. 4A. The same may be done to the inlet and outlet ports of bore 62. Prior to a meat carving operation, the lower regions of reservoir 52 may be initially charged with water so that undesirable fats and oils do not pass beneath dam plate 80 at the beginning of a carving operation.

Figure 7:
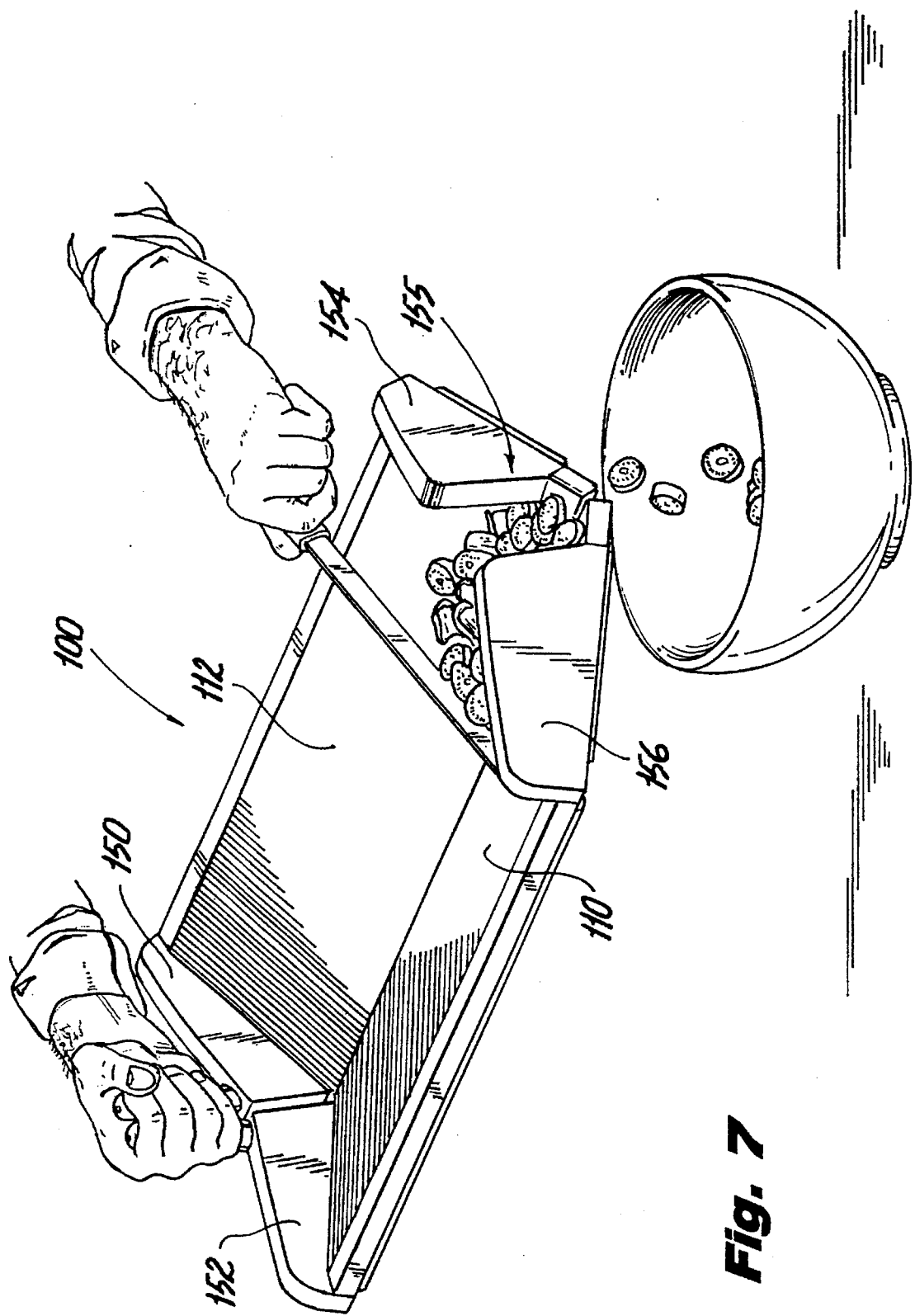
FIG. 7 is a perspective view of the cutting board assembly of the subject invention in a folded condition as sliced vegetables are directed into a receptacle.

Referring once again to FIG. 1, the food preparation assembly 10 of the subject invention also includes a foldable cutting board assembly 100 for slicing and chopping fresh vegetables and/or fruits. As illustrated in FIG. 7, the unique construction of cutting board assembly 100 facilitates the convenient transference of processed vegetables and/or fruit from the cutting board assembly into an appropriate receptacle without risk of spillage.

Referring to FIGS. 8 and 9, cutting board assembly 100 includes planar board section 110 and 112 of generally rectangular configuration. A hinge assembly 114 operatively connects the board sections to one another and facilitates their relative movement between a first position wherein the board sections are in planar alignment with one another and a second position wherein the board sections are angularly disposed with respect to one another.

Hinge assembly 114 includes a plurality of generally cylindrical span members 115 each having a respective axial bore 116 extending therethrough for receiving an elongate retention rod 118. Each of the span members 115 also have a respective transverse bore 120 for receiving an end portion of a threaded rod 122. Threaded rods 122 are supported within corresponding reception bores 124 formed within the panels 110 and 112 of cutting board assembly 100. End stops 126 and 128 are disposed at the opposed ends of hinge assembly 114 and include respective fasteners 130 and 132 for engaging retention rod 118. As best seen in FIG. 9, an elastomeric sleeve 134 is disposed within each bore 124 to releasably support the retention rod disposed therein. This construction enables the entire hinge assembly to be easily disassembled for cleaning.

Referring to FIGS. 2 and 8, engagement flanges 140 depend from the undersurface 142 of panel 110, and engagement flanges 144 depend from the undersurface 146 of panel 112. These flanges are particularly arranged, dimensioned and configured to operatively engage the collection channel 30 defined in the platform 22 of carving board assembly 20, so as to fixedly support the cutting board assembly 100 during utilization.

Upstanding rear walls 150 and 152 are provided on panels 110 and 112, respectively, and have respective cooperating angled surfaces 150a and 152a which abut one another when the cutting board assembly 100 is folded in an angular configuration during use. Upstanding front walls 154 and 156 are provided on panels 110 and 112, respectively, and have respective cooperating angled surfaces 154a and 156a which define a gap 155 when cutting board assembly 100 is folded to permit the orderly passage of vegetables or fruits from the board assembly after they have been sliced. Handles 160 and 162 are mounted on rear walls 150 and 152, respectively, to enable a user to move panels 110 and 112 into a folded position and maintain the panels in such a condition as the cutting board assembly is transported to an appropriate receptacle (see FIG. 7).

In use, cutting board assembly 100 is preferably supported on the carving platform 22 of carving board assembly 20, as illustrated in FIG. 1, to maintain the cutting board in a desired stable orientation. Fruits and vegetables are then sliced in accordance with a desired recipe. Thereafter, handles 160 and 162 are grasped and approximated by the user, causing panels 110 and 112 to pivot into an angular orientation about hinge assembly 114, and the cutting board assembly is moved toward an appropriate receptacle. At such a time, the sliced vegetables are urged toward upstanding front walls 154 and 156 and through the gap 155 defined therebetween. After use, the cutting board assembly may be easily disassembled for cleaning by separating panels 110 and 112 from hinge assembly 114, and subsequently removing ends stops 126 and 128 from the hinge assembly 114.

Figure 10:
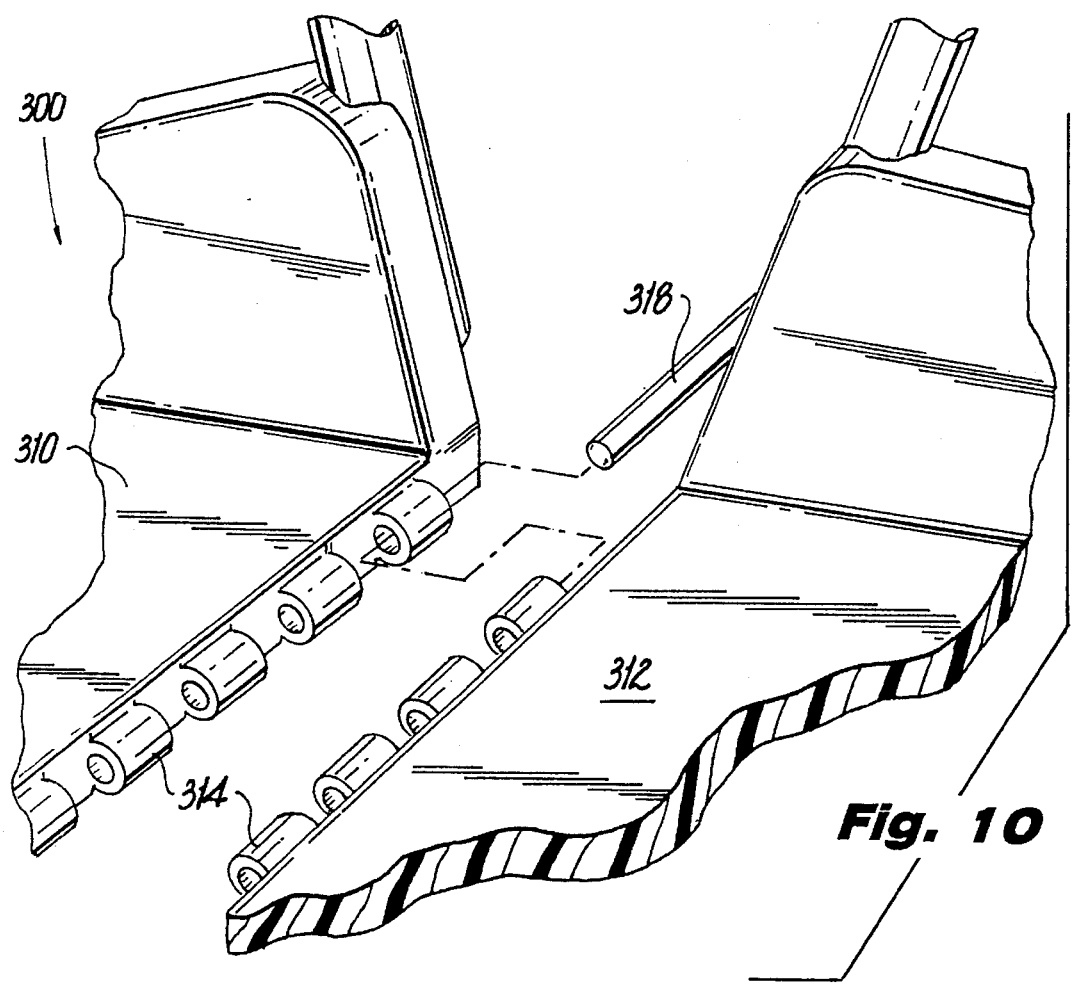
FIG. 10 is a perspective view of a portion of another embodiment of the cutting board assembly of the subject invention wherein complementary portions of the hinge are formed integral with the board sections.
Figure 11:
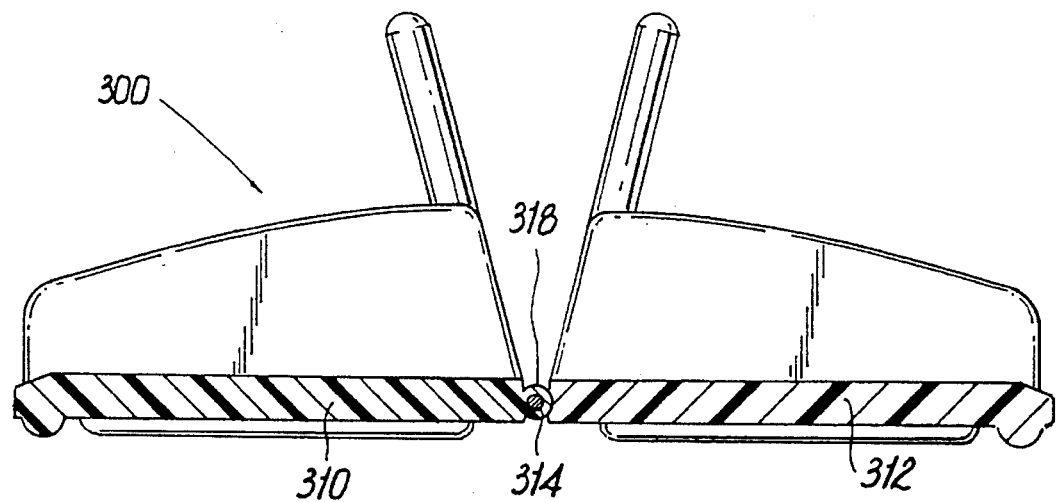
FIG. 11 is a cross-sectional view taken across the width of the cutting board assembly of FIG. 10 illustrating the assembled integral hinge.

Referring to FIGS. 10 and 11, another cutting board assembly constructed in accordance with a preferred embodiment of the subject invention is illustrated and is designated generally by reference numeral 300. Cutting board assembly 300 is substantially similar to cutting board assembly 100 in configuration and function. However, portions of the hinge assembly 314 are formed integral with panels 310 and 312, and a central retention rod 318 is provided to extend therethrough. The panels can be constructed from wood, nylon, plastic or a similar food grade material.

Although the subject invention has been described with respect to a preferred embodiment, it is apparent that changes or modifications may be made thereto without departing from the spirit or scope of the invention as defined by the appended claims.

What is claimed is:

1. A carving board assembly comprising:

a carving board platform having a substantially planar carving surface and having a sloping collection channel defined therein extending about the periphery of said carving surface for collecting drippings, separator means associated with said collection channel for separating the dripping according to their relative densities and for distributing the separated drippings to respective catchment basins, and respective catchment basins adjacent said separator means for retaining the separated drippings.

2. A carving board assembly as recited in claim 1, wherein said separator means includes a distribution channel defined in said carving platform, a guide channel communicating said collection channel with said distribution channel, and a density selective dam disposed within said distribution channel.

3. A carving board assembly as recited in claim 2, wherein said distribution channel is defined by a central collection reservoir, opposed first and second radial channels, an annular channel associated with each radial channel, and an exit port associated with each annular channel which extends through said carving platform for permitting the egress of separated drippings from said distribution channel.

4. A carving board assembly as recited in claim 3, wherein said collection reservoir has a greater depth that each of said radial channels.

5. A carving board assembly as recited in claim 3, wherein each exit port is dimensioned and configured to be blocked by a user's finger.

6. A carving board assembly as recited in claim 1, further comprising a pair of opposed lateral struts depending from said carving platform to elevate said carving surface.

7. A carving board assembly as recited in claim 1, wherein means extend from an undersurface of said platform for resiliently retaining said catchment basins adjacent said separator means.

8. A foldable cutting board assembly comprising:

first and second substantially planar board sections each defining a respective cutting surface, said board sections hingedly connected to one another along adjacent lateral edges thereof, each of said board sections having opposed front and rear edges and including upstanding walls at each edge, the upstanding walls disposed at the front edges of said first and second board sections together defining a passageway through which objects cut on said cutting surfaces are passed, whereby said board sections are configured to be parallel to one another to cut objects thereupon and at an angle to one another to funnel the cut objects through said passageway.

9. A foldable cutting board assembly as recited in claim 8, wherein each of said board sections is monolithically formed with at least a portion of a hinge assembly.

10. A foldable cutting board assembly as recited in claim 8, further comprising a gripping handle extending from the upstanding wall disposed at the rear edge of each board section.

11. A foldable cutting board assembly as recited in claim 8, further comprising means adjacent said upstanding rear walls for maintaining the relative orientation of the board section in a folded position.

12. A food preparation assembly comprising:

a) a carving board unit including a carving platform having a substantially planar carving surface with a collection channel defined therein extending about the periphery of said carving surface for collecting drippings; and b) a cutting board unit including an upper cutting surface and a lower undersurface, and at least two parallel flanges depending from said undersurface of said cutting board unit dimensioned and configured to engage said collection channel in said carving platform to stabilize said cutting board unit during utilization.

13. A food preparation assembly as recited in claim 12, wherein said carving board unit further comprises separator means associated with said collection channel for separating the drippings in dependance upon relative density and for distributing the separated drippings to respective catchment basins for subsequent utilization.

14. A food preparation assembly as recited in claim 13, wherein said separator means includes a distribution channel defined in said carving platform, a guide channel communicating said collection channel with said distribution channel, and a density selective dam disposed within said distribution channel.

15. A food preparation assembly as recited in claim 14, wherein said distribution channel is defined by a central collection reservoir, opposed first and second radial channels, an annular channel associated with each radial channel, and an exit port associated with each annular channel which extends through said carving platform for permitting the egress of separated drippings from said distribution channel.

16. A food preparation assembly as recited in claim 15, wherein said collection reservoir has a greater depth that each of said radial channels.

17. A food preparation assembly as recited in claim 16, wherein said dam resides within said collection reservoir and includes an aperture located below the level of said radial channels.

18. A food preparation assembly as recited in claim 12, wherein further comprising a pair of opposed lateral struts depending from said carving platform to elevate said carving surface.

19. A food preparation assembly as recited in claim 12, wherein said cutting board unit includes first and second substantially planar board sections each defining a respective cutting surface, said board sections hingedly connected to one another along adjacent lateral edges thereof.

20. A food preparation assembly as recited in claim 19, wherein each of said board sections have opposed front and rear edges and includes upstanding walls at each edge, the upstanding walls disposed at the front edges of said first and second board sections together defining a passageway through which objects cut on said cutting surfaces are passed.

21. A food preparation assembly as recited in claim 19, wherein each of said board sections is monolithically formed with at least a portion of a hinge assembly.

22. A food preparation assembly as recited in claim 19, wherein a gripping handle extends from the upstanding wall disposed at the rear edge of each board section.

* * * * *